US012241685B2

(12) United States Patent
Chan et al.

(10) Patent No.: US 12,241,685 B2
(45) Date of Patent: Mar. 4, 2025

(54) DEVICE AND METHOD FOR CONTROLLING A REHEATING FURNACE

(71) Applicant: FIVES STEIN, Maisons-Alfort (FR)

(72) Inventors: Yee Yuen Chan, Maisons-Alfort (FR); Jean-Luc Magalhaes, Boissy-sans-Avoir (FR)

(73) Assignee: FIVES STEIN (FR)

( * ) Notice: Subject to any disclaimer, the term of this patent is extended or adjusted under 35 U.S.C. 154(b) by 459 days.

(21) Appl. No.: 17/771,885

(22) PCT Filed: Oct. 7, 2020

(86) PCT No.: PCT/FR2020/051762
§ 371 (c)(1),
(2) Date: Apr. 26, 2022

(87) PCT Pub. No.: WO2021/084174
PCT Pub. Date: May 6, 2021

(65) Prior Publication Data
US 2022/0404098 A1 Dec. 22, 2022

(30) Foreign Application Priority Data
Oct. 28, 2019 (FR) ...................................... 1912077

(51) Int. Cl.
*F27B 9/40* (2006.01)
*F27D 19/00* (2006.01)
(Continued)

(52) U.S. Cl.
CPC ................ *F27B 9/40* (2013.01); *F27D 19/00* (2013.01); *F27D 21/02* (2013.01); *F27B 9/20* (2013.01);
(Continued)

(58) Field of Classification Search
CPC .... F27B 9/20; F27B 9/40; F27D 19/00; F27D 21/02; F27D 2019/0003; F27D 2019/0065; F27D 2021/026
(Continued)

(56) References Cited

U.S. PATENT DOCUMENTS

2006/0060787 A1* 3/2006 Herrington ............ G01N 21/59 250/343
2018/0017374 A1* 1/2018 Chan ...................... G01B 11/06
(Continued)

FOREIGN PATENT DOCUMENTS

CN 109844143 6/2019
CN 110312927 10/2019
(Continued)

OTHER PUBLICATIONS

JP 2004061273 A—Translation (Year: 2004).*
ES 2369276 T3—Translation (Year: 2011).*
WO 2012019951 A1—Translation (Year: 2012).*

*Primary Examiner* — Steven B McAllister
*Assistant Examiner* — Benjamin W Johnson
(74) *Attorney, Agent, or Firm* — The Belles Group, P.C.

(57) ABSTRACT

A method for controlling a furnace for reheating iron and steel products, comprising forming an infrared image, using an infrared camera, of an upper face of a product over the width and at least partially over the length thereof when said product is arranged on a predetermined discharging surface; digital processing comprising binarization of the infrared image into two classes of pixels, one class that corresponds to the pixels associated with the presence of scale that is bonded on the face of the product and one class that corresponds to the pixels associated with the presence of scale that is not bonded on the face of the product; determining the amounts of non-bonded scale and of bonded scale on the upper face of the product on the basis of the
(Continued)

binarized image; modifying furnace control parameters on the basis of the determined amounts of non-bonded scale and of bonded scale.

12 Claims, 6 Drawing Sheets

(51) Int. Cl.
*F27D 21/02* (2006.01)
*F27B 9/20* (2006.01)

(52) U.S. Cl.
CPC ................ *F27D 2019/0003* (2013.01); *F27D 2019/0065* (2013.01); *F27D 2021/026* (2013.01)

(58) Field of Classification Search
USPC .............................................................. 432/8
See application file for complete search history.

(56) References Cited

U.S. PATENT DOCUMENTS

| | | | | |
|---|---|---|---|---|
| 2018/0046878 | A1 * | 2/2018 | Wang | G06V 10/44 |
| 2019/0322562 | A1 | 10/2019 | Turner et al. | |

FOREIGN PATENT DOCUMENTS

| | | | | | |
|---|---|---|---|---|---|
| ES | 2369276 | T3 * | 11/2011 | | |
| FR | 3032265 | | 8/2016 | | |
| JP | H03109105 | | 11/1991 | | |
| JP | 2004061273 | A * | 2/2004 | | |
| JP | 2007263834 | | 10/2007 | | |
| JP | 2018015811 | | 2/2018 | | |
| KR | 19990048922 | | 7/1999 | | |
| KR | 20140042076 | | 4/2014 | | |
| KR | 101424484 | B1 | 7/2014 | | |
| KR | 20190070675 | A | 6/2019 | | |
| WO | 02/079527 | | 10/2002 | | |
| WO | WO-2012019951 | A1 * | 2/2012 | | F27B 9/20 |
| WO | 2016125096 | A1 | 8/2016 | | |

* cited by examiner

[Fig.1]
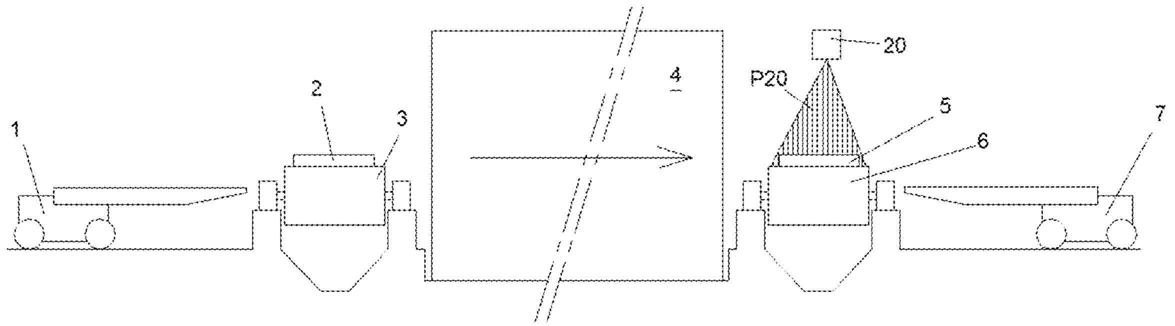
[Fig.2]
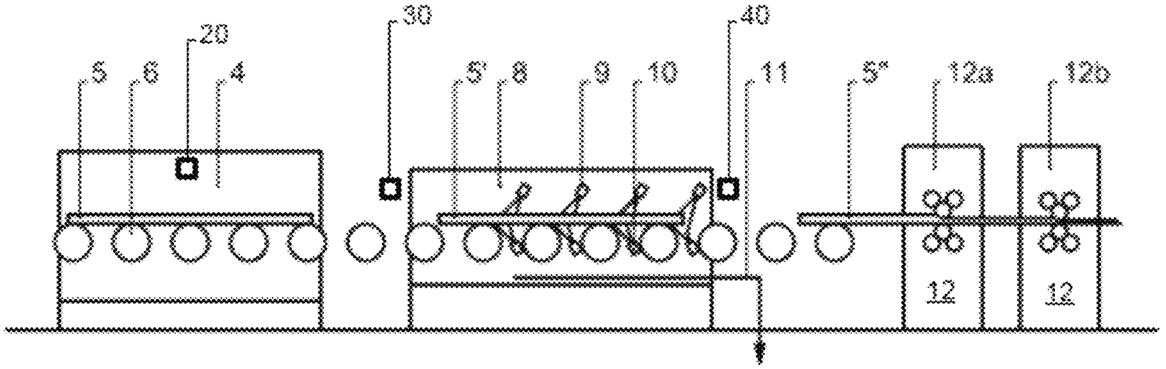
[Fig.3]
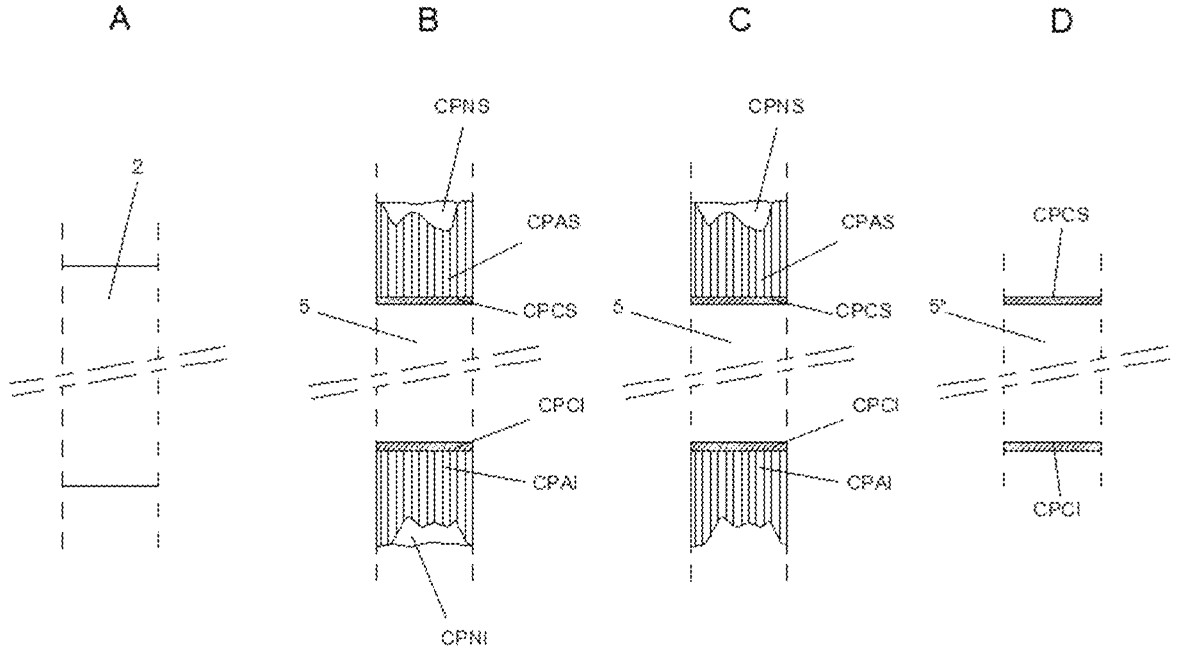

[Fig.4]
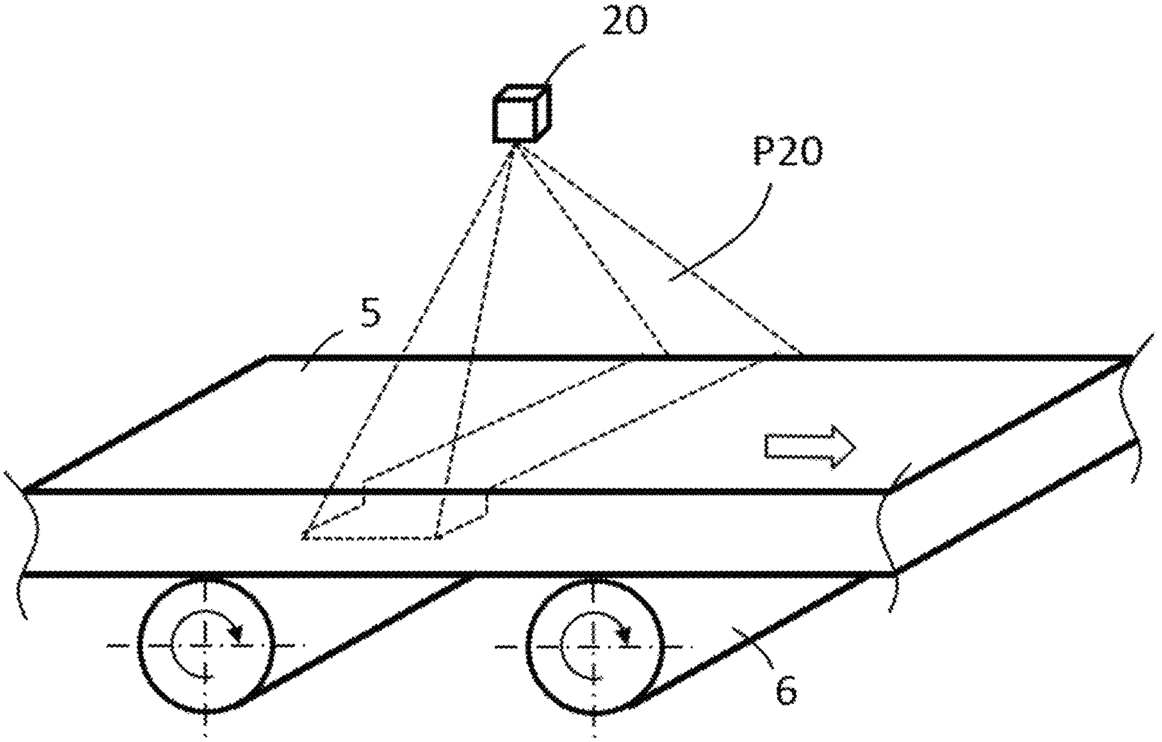
[Fig.5]
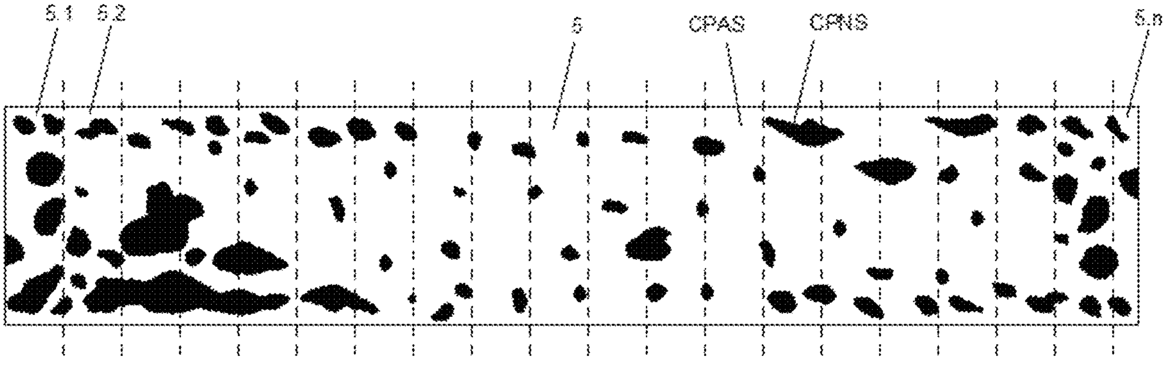

[Fig.6]
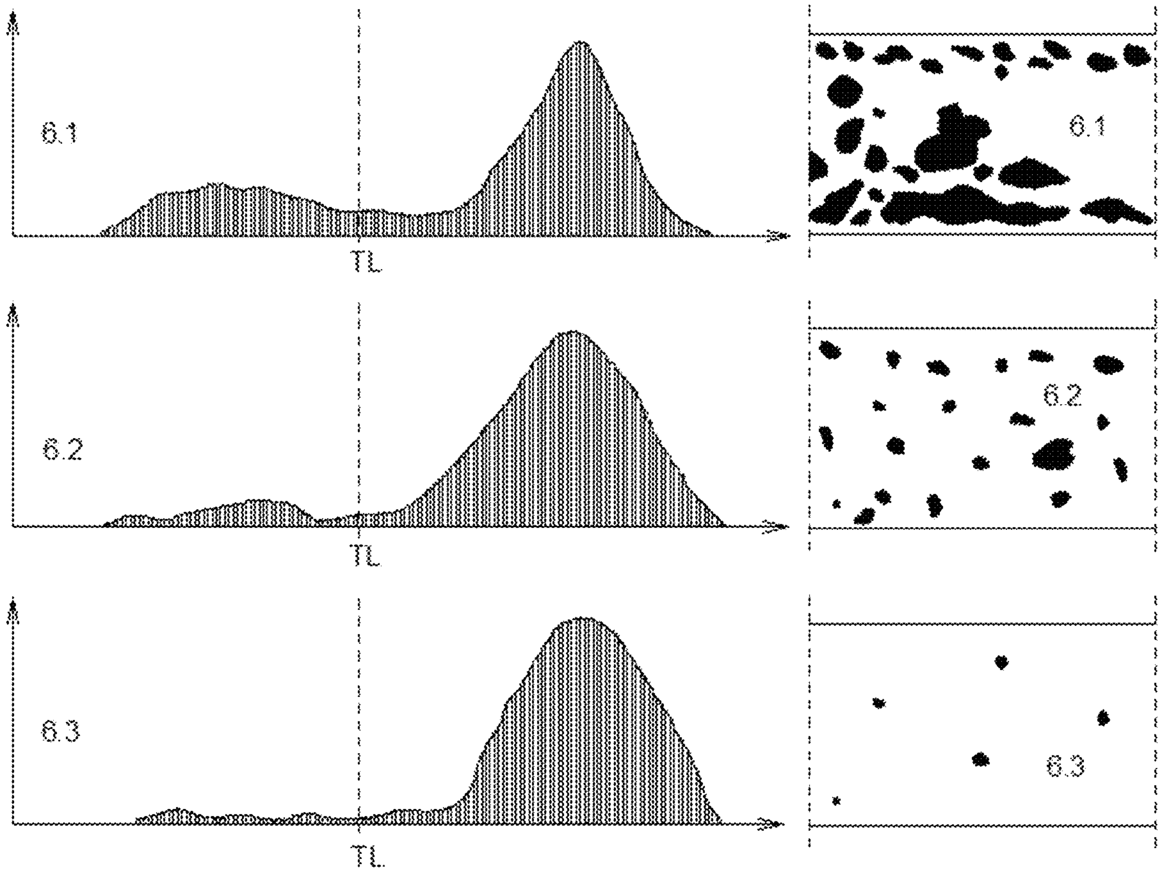

[Fig.7]
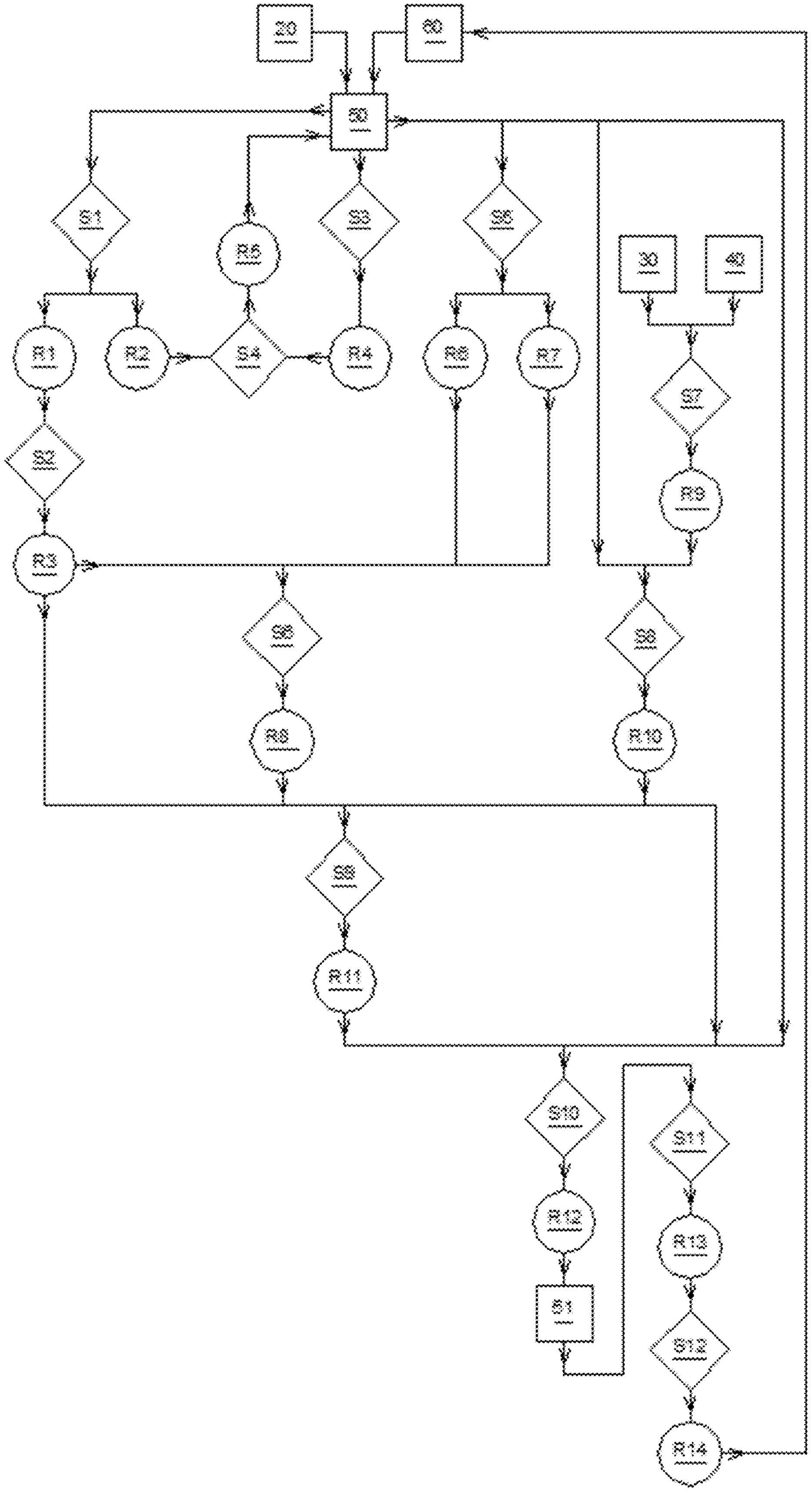

[Fig.8]
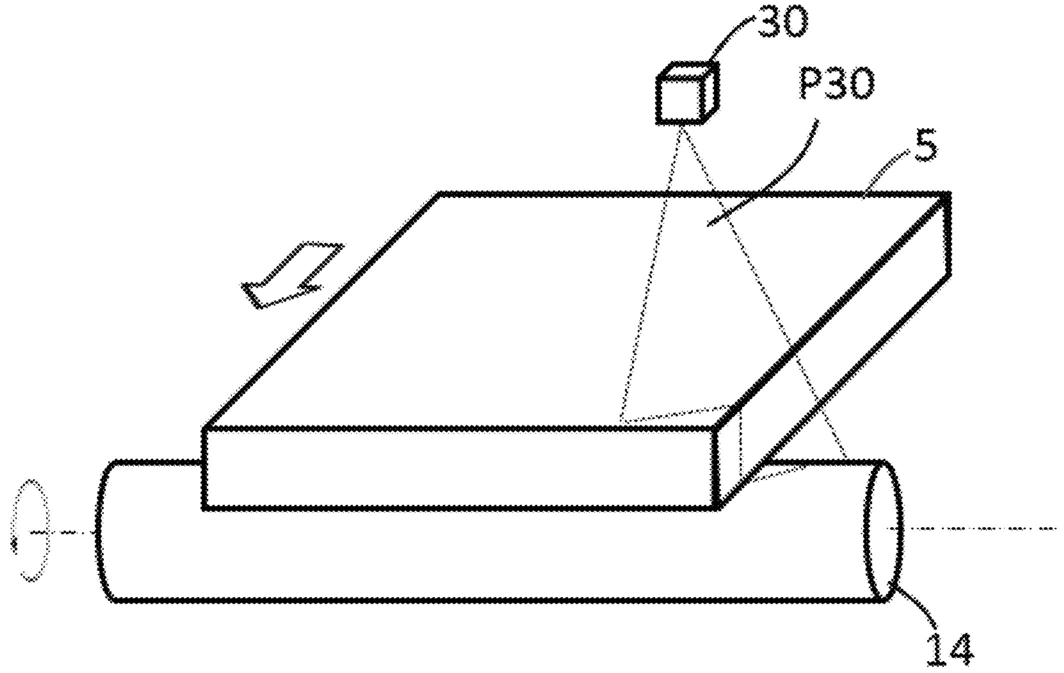
[Fig.9A]
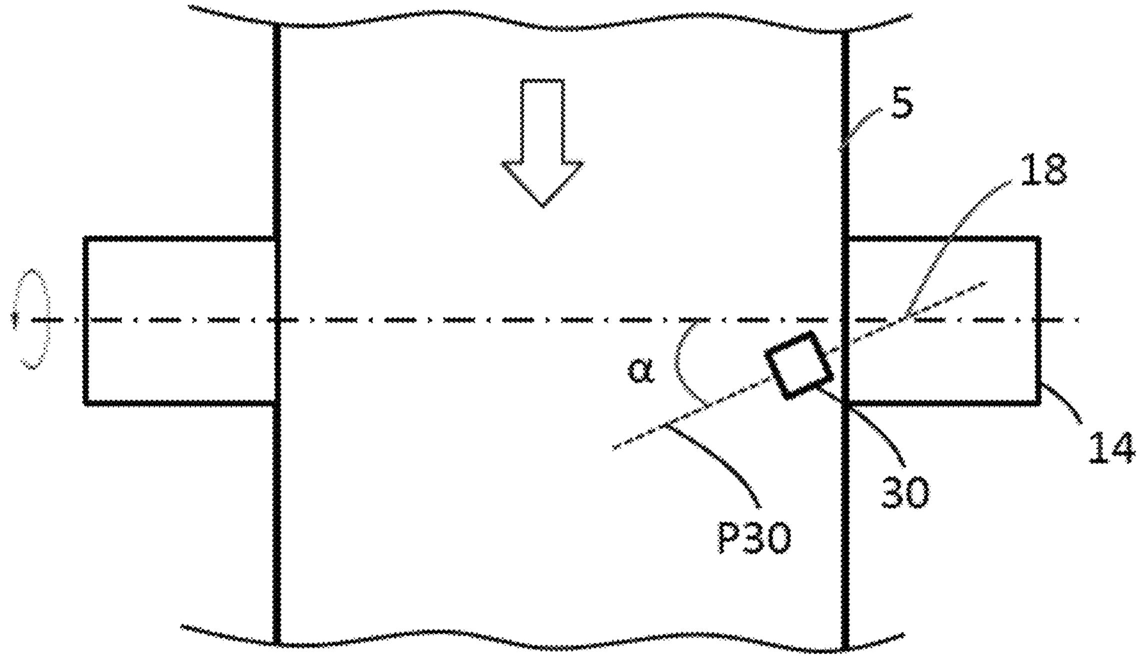

[Fig.9B]
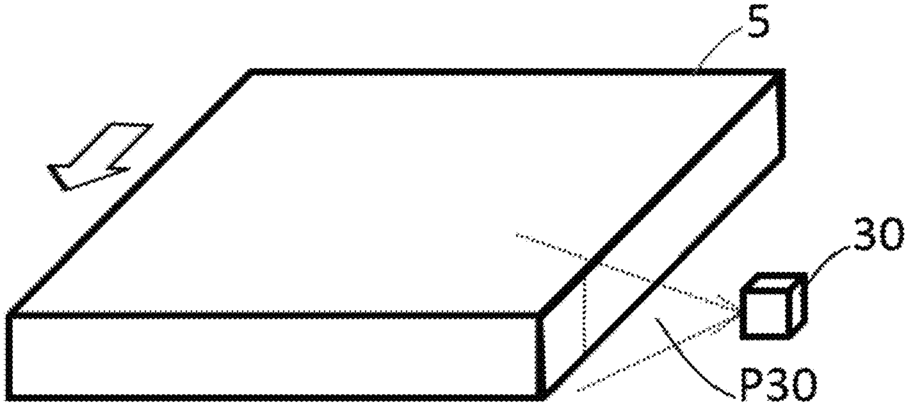
[Fig.10]
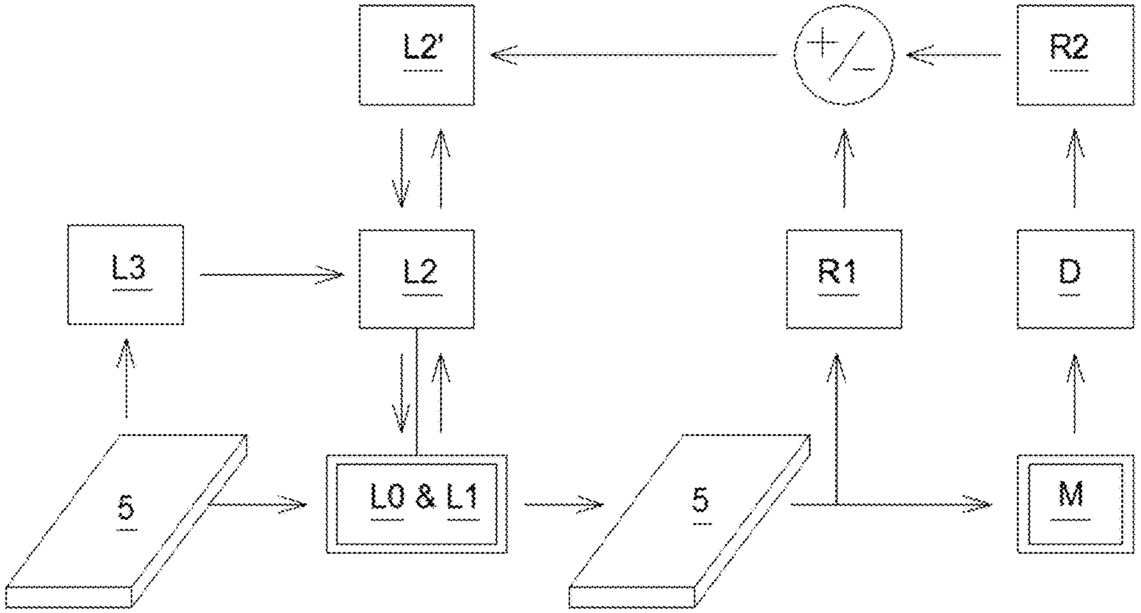
[Fig.11]
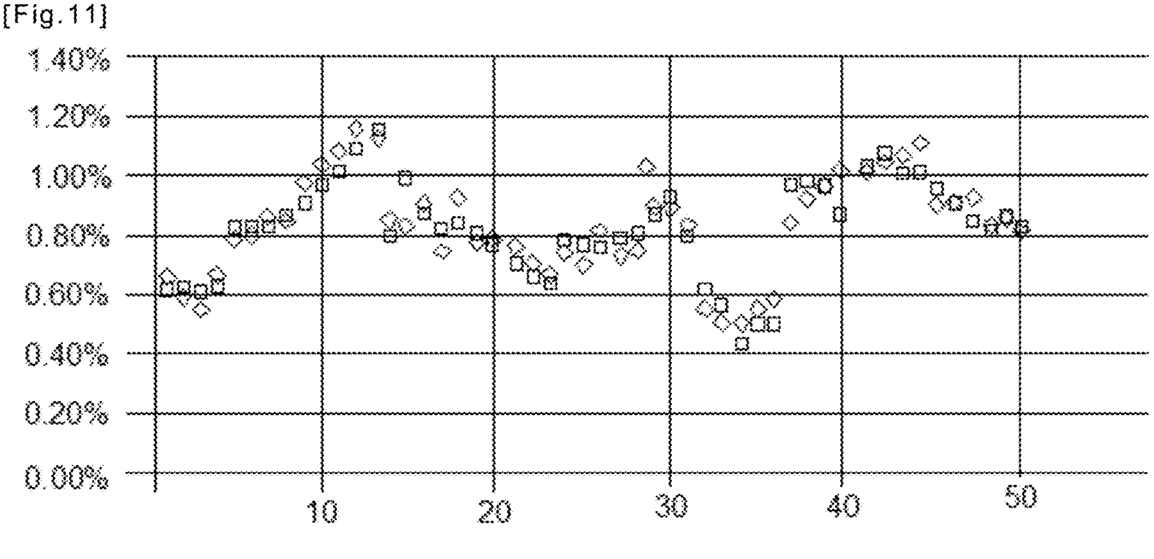

DEVICE AND METHOD FOR CONTROLLING A REHEATING FURNACE

CROSS-REFERENCE TO RELATED PATENT APPLICATIONS

The present application is a U.S. national stage application under 35 U.S.C. § 371 of PCT Application No. PCT/FR2020/051762 filed Oct. 7, 2020, which claims priority to French Patent Application No. 1912077 filed Oct. 28, 2019. The disclosures of the aforementioned priority applications are incorporated herein by reference in their entireties.

The invention relates to a device and a method for controlling a furnace for reheating iron and steel products. It particularly applies to reheating long products and more particularly to flat products, in particular slabs. The device and the method according to the invention allow the total loss on ignition linked to reheating a product in the furnace to be quantified, by determining the amount of scale that has fallen into the furnace and that which is removed by a descaling machine located downstream of the furnace in the direction of travel of the product. They also allow the operation of the furnace to be optimized and this loss on ignition to be reduced.

Technical Problems Addressed by the Invention

Reheating furnaces are located upstream of the hot rolling mills for iron and steel semi-products such as billets, blooms or slabs. Within them, the metal is heated to a high temperature in a reheating furnace in order to facilitate the rolling operation. The important criteria for this reheating and rolling process are the quality of the rolled product, the productivity of the facility and its operating cost.

In these reheating furnaces, numerous burners are conventionally located along the side walls of the furnace, sometimes also in the vault, in order to provide the heating function. Their fuel supply is mainly made up of natural gas, LPG or liquid fuel oil. However, with the increase in the price of these fuels, it has become common to burn fuels that are available on site, as by-products of the methods implemented on the site. These fuels have a lower calorific value and they contain more impurities, but they are much less expensive. This is the case, for example, of COG (Coke Oven Gas) or of BFG (Blast Furnace Gas). The flue gases are discharged from the furnace by a suction system, via a heat recovery unit that allows the combustion air supplying the burners to be pre-heated. The hot flue gases react with the surface of the product reheated in the furnace, resulting in the formation of surface layers of oxides. These layers are also called scale layers. A distinction is made between primary scale, comprising the scale that has detached and fallen into the furnace and that which is removed by the descaling machine located downstream of the furnace, before rolling, and secondary and tertiary scale formed during rolling. Primary scale is also called non-bonded scale and bonded scale. The non-bonded scale of the lower face of the products largely falls into the furnace. The descaling machine eliminates the non-bonded scale still present on the product, in particular on its upper face where most of it is present at the inlet of the descaling machine, and the bonded scale. Bonded primary scale denotes that which cannot be removed by the descaling machine and that therefore remains attached to the product when it exits said machine. The thickness of the bonded primary scale is a few tenths of millimeters, whereas that of the bonded and non-bonded primary scale is expressed in millimeters.

The composition of the flue gases depends on the type of fuel and the adjustment of the burners. It has a direct impact on the proportion of scale that is formed, as well as on its chemical and mechanical properties. For example, according to the article *"Scaling of carbon steel in simulated reheat furnace atmospheres*, V. H. J. Lee, B. Gleesin, D. J. Young in 2004," the oxidation of carbon steel in hot flue gases leads to linear kinetics in a certain range of air/gas ratios, and to parabolic scale growth for high air/gas ratios. In addition, the loss of material resulting from the formation of scale, called "loss on ignition," has a considerable economic impact. For example, for a reheating furnace with an annual production capacity of 2.5 million tons, a carbon steel price of US$400/ton, a loss on ignition of 0.7-1% is equivalent to a loss of turnover of US$7 to 10 million. Moreover, a not insignificant energy and environmental impact is also present when taking into account the amount of energy that is consumed, and the pollution that is generated, in order to manufacture the amount of steel lost to scale and to recycle the scale recovered from the descaling machine. For this reason, it is important to limit the formation of scale during heating before rolling.

In the industrial world, digital models are able to predict the loss on ignition for certain steel grades with defined and stable conditions. The thesis by Mr. Husein Abuluwefa "*Scale formation in a walking-beam Steel Reheat Furnace*," McGill University-1992, is one example. However, the actual operation of a furnace is never perfectly stable, since the heating curve of the product changes as a function of the actual production of the furnace. Similarly, the composition of the flue gases changes according to the quality of the fuel, the precision of the regulating components and instruments and their calibration frequency. In addition, each steel mill has its own steel recipe to meet a specific demand from the world market. Thus, a mod& validated under specific conditions will have limitations in terms of prediction under other conditions.

Despite all the efforts implemented within various teams around the world, a monitoring system does not yet exist with the ability to:

- measure and monitor the formation of primary scale in real time;
- reduce loss on ignition.

Technical Background

The formation of scale, when steel passes through an industrial reheating furnace before rolling, results from the oxidation of the iron (contained in the steel) in contact with oxygen and other oxidizing gases of the combustion products present in the furnace.

Numerous causes contribute to the complexity of this phenomenon:

- Iron essentially has three degrees of oxidation that will be found in the scale in the form of FeO, Fe3O4 and Fe2O3. Several crossed-over reaction paths can lead to the formation of these oxides. The chemical and mechanical properties of each layer are different. Furthermore, the thickness of the scale is not uniform over the entire surface of a product.
- The kinetics of the various oxidation pathways vary according to the conditions present in the furnace, with these not being homogeneous at all points of the furnace.
- The oxidation kinetics also can be affected by the chemical composition of the steel, on the one hand, and by that of the flue gases generated by the burners, on the other hand. The composition of the flue gases depends on both the type of fuel and the settings of the burners.

The residence time of the products in the furnace and their temperature curve, and therefore the exposure to oxidizing conditions, can also vary.

Technologies exist on the market for determining the coating thickness, such as ultrasound or ellipsometry. However, these are solutions that carry out measurements in less restricted environments, in particular:

at ambient temperature;

in a transparent atmosphere;

with a smooth coating surface condition;

with a coating thickness of the order of a nanometer.

None of them addresses all the problems of the subject matter:

high temperature: up to 1,280° C. when discharged from the furnace;

surfaces with coarse roughness exhibiting irregularities;

different chemical and mechanical properties for each scale layer.

One of the conventional methods for identifying loss on ignition is to place small samples above a product equipped with thermocouples, and to heat them in the furnace. After heating, the samples are recovered using specific tools in order to carry out measurements on them after they return to ambient temperature. This solution is difficult to implement and exhibits risks for the operators who must recover the samples at the outlet of the furnace while the product and the samples are at high temperature.

Another conventional method involves weighing the cold product before and after heating in order to determine the loss on ignition. This type of measure also requires significant preparatory work and resources.

WO2016125096 by the applicant describes a first solution for continuously monitoring the production of scale in a reheating furnace on the basis of data measured using optical laser sensors placed at the outlet of the furnace.

The device comprises at least one optical sensor placed at the outlet of the furnace scanning the lower face of the product, which allows a map of the relief of the product to be produced when the product is reeled-off. Analyzing the map of the relief of the lower surface of the product allows the amount of scale that has fallen into the furnace to be determined. The high points on the surface of the product correspond to the sites where the scale is still present on the product. Conversely, the low points correspond to the sites on the surface of the product where the scale has detached and fallen into the furnace.

The device also comprises two sets of at least two optical sensors, one placed upstream of the descaling machine and the other placed downstream thereof, allowing the height of the product upstream and downstream of the descaling machine to be determined, and by virtue of the difference in these heights, allowing the amount of scale that has fallen into the descaling machine to be determined.

Depending on the amount of scale formed in the furnace that is determined using these sensors, a correction of the operating parameters of the furnace is carried out in order to reduce the amount of scale formed during reheating.

This solution is not fully satisfactory, because, in practice, several sensors are necessary at the outlet of the furnace in order to cover the lower face of the products over the entire width of the furnace due to the constraints of installing laser sensors on the roller table and their narrow beam width. Complex image processing is required to reconstitute the map of the products on the basis of the images captured by the sensors that are arranged in parallel. Although an inclined screen is arranged above the sensors in order to protect them, this screen wears out quickly due to the abrasion caused by falling scale. In addition, in the long term, scale remains adhered to the inclined screen, which partially masks the surface of the products. Regular interventions are thus required in order to maintain the device whereas the site is difficult to access and poses risks for the operators.

An aim of the invention is to overcome all or some of the disadvantages of the prior art, and/or to improve the flexibility and the simplicity of controlling a reheating furnace, while maintaining or improving the robustness and the cost of this control, and the maintenance and/or the operation of the means by which this reheating furnace is controlled.

SUMMARY OF THE INVENTION

According to a first aspect of the invention, a method is proposed for controlling a furnace for reheating iron and steel products having an inlet and an outlet in a reeling-off direction of the product, comprising:

forming an infrared image, using an infrared camera, of an upper face of a product over the width and at least partially over the length thereof when said product is arranged on a predetermined discharging surface (located outside the furnace and at the outlet of the furnace);

digital processing comprising binarization (the binarization being able to be carried out by thresholding or segmentation) of the infrared image into two classes of pixels, one class of pixels that corresponds to the pixels associated with the presence of scale that is bonded on the upper face of the product and the other class of pixels that corresponds to the pixels associated with the presence of scale that is not bonded on the face of the product;

determining the amounts of non-bonded scale and of bonded scale on the upper face of the product on the basis of the binarized image;

modifying furnace control parameters on the basis of the determined amounts of non-bonded scale and bonded scale.

With a control method according to the invention, it is possible to control the furnace while taking into account the respective amounts of non-bonded and bonded scale on the surface of a product, and therefore to adapt one or more control parameter(s) accordingly.

Although only one face of the product is observed by the camera, the invention allows the determination of the temperature of the unobserved face obtained by computation to be corrected, by means of a correction factor that is determined on the basis of a difference between, on the one hand, the effective temperature of the observed face obtained by the camera and, on the other hand, a temperature of the observed face obtained by computation.

The method according to the invention can further comprise determining a ratio of the amount of bonded scale to the amount of non-bonded scale.

The binarization can be carried out by thresholding the light intensity of the pixels.

Since the light intensity of a pixel represents the surface temperature of the product in the vicinity of the pixel, thresholding is an efficient method for classifying pixels.

The method can comprise digital processing for determining a loss on ignition of the product.

Determining the loss on ignition and knowing the respective amounts of the two types of scale on the upper surface allows a first approximation to be determined of the amount of non-bonded scale from the lower surface that has fallen into the furnace, which is important information for managing the production of the furnace.

As a first approximation, it can be assumed, for example, that the ratio r between non-bonded scale and bonded scale is the same on the upper face and the lower face, and, by knowing the loss on ignition pF, it is possible to deduce the mass mCPNS of non-bonded scale that has fallen into the furnace, which can be expressed as mCPNS=r*pf/2, if it is also considered that the lower mass is equal to the upper mass and that the loss on ignition is homogeneous on the two faces.

Preferably, the method comprises measuring the height of the product using two sensors that are respectively arranged upstream and downstream of a descaling machine located downstream of the furnace, and digital processing for determining the loss on ignition of the product by determining the difference in the height of the product between the upstream side and the downstream side of said descaling machine.

It is thus possible to refine the determination of the loss on ignition.

The sensors can be optical sensors, which are well suited to the requirements and to the operating conditions of a facility for reheating iron and steel products.

The method according to the invention can further comprise, when the upper face is imaged by the infrared camera, determining the amount of scale on the lower face of the product that has fallen into the furnace using digital simulations on the basis of the amounts of non-bonded scale and of bonded scale on the upper surface of the product obtained on the basis of the binarized image, on the basis of the determined loss on ignition, and of a correlation of these results with operating readings of the furnace and a scale formation prediction law.

Correlating the measured results with the operating readings of the furnace allows the furnace control strategy to be refined.

According to one possibility, the method comprises a step of reducing the loss on ignition and the amount of scale that has fallen into the furnace for a second product, which is reheated after a first product is reheated by modifying the operating parameters of the furnace as a function of the loss on ignition of the first product when it passes through the furnace and the determined amount of scale.

Advantageously, the scale formation prediction law can be modified by self-learning.

The method can comprise a step of reducing the loss on ignition and the amount of scale that has fallen into the furnace for a second product, which is reheated after a first product is reheated by modifying the operating parameters of the furnace as a function of the loss on ignition of the first product when it passes through the furnace and the determined amount of scale.

According to a second aspect of the invention, a device is proposed for controlling a furnace for reheating iron and steel products having an inlet and an outlet in a reeling-off direction of the product, comprising:

- an infrared camera provided to form an infrared image of an upper face of a product over the width and at least partially over the length thereof when said product is arranged on a predetermined discharging surface (located outside the furnace and at the furnace outlet);
- a digital processing module arranged to carry out binarization of the infrared image into two classes of pixels, one class of pixels that corresponds to the pixels associated with the presence of scale that is bonded on the face of the product and the other class of pixels that corresponds to the pixels associated with the presence of scale that is not bonded on the face of the product;
- a module for determining the amounts of non-bonded scale and of bonded scale on the upper face of the product on the basis of the binarized image;
- a module for modifying parameters for controlling the furnace on the basis of the determined amounts of non-bonded scale and of bonded scale.

According to one embodiment, the furnace can form part of an iron and steel facility comprising a discharging table (also called an evacuation table, preferably a roller table) forming the predetermined discharging surface.

The product reels-off under the camera and it is thus possible to reconstitute the complete image of the product.

The device for controlling the furnace can comprise two sensors respectively arranged upstream and downstream of a descaling machine located downstream of the furnace, and a digital processing module configured for determining the loss on ignition of the product by determining the difference in the height of the product between the upstream side and the downstream side of said descaling machine. As previously stated, the sensors can be optical sensors.

According to a third aspect of the invention, a facility is proposed comprising:

- a furnace for reheating iron and steel product;
- a device for controlling the furnace in accordance with the second aspect of the invention, or with one or more of its improvements.

When the facility comprises a discharging table, the discharging table can form the predetermined discharging surface.

When the facility comprises a descaling machine, the control device can comprise the two aforementioned sensors respectively arranged upstream and downstream of a descaling machine located downstream of the furnace, and the control device can comprise a digital processing module for determining the loss on ignition of the product by determining the difference in the height of the product between the upstream side and the downstream side of said descaling machine.

According to a fourth aspect of the invention, a computer program product is proposed comprising instructions that lead a facility according to the third aspect of the invention, or one or more of its improvements, to execute the steps of the method according to the first aspect of the invention, or one or more of its improvements.

According to yet another aspect of the invention, a computer-readable medium is proposed, on which the computer program product according to the fourth aspect of the invention is stored.

The invention comprises both functions for measuring primary scale and functions for predicting and controlling scale formation, all in real time. It thus combines physical measurements taken in real time by sensors and digital modeling for processing gathered and prediction data. It allows the product heating process to be optimized by reducing the formation of primary scale.

According to particular embodiments of the invention, the method or the device comprises one or more of the following features, taken individually or in any technically possible combination(s):

- A device for acquiring images of part of the upper face of a product exiting a furnace in the infrared spectrum by means of an infrared camera.
- A system for processing a plurality of images of parts of the upper face of a product exiting a furnace in the infrared spectrum allowing an image of the entire surface of said product to be reconstituted.

A system for determining the surface covered by non-bonded scale on the upper face of a product exiting a furnace on the basis of an image in the infrared spectrum of the surface of said product.

A system for determining the surface covered by non-bonded scale on the lower face of a product exiting a furnace obtained by digital simulation on the basis of an image in the infrared spectrum of the surface of the upper face of the product correlated to operating readings of the furnace.

A device for measuring the height of scale detached from a product in a descaling machine placed downstream of a furnace by means of optical sensors placed upstream and downstream of the descaling machine.

A system for determining the loss on ignition of a product on the basis of the height of scale detached from a product in a descaling machine placed downstream of a furnace.

A software application for processing data from an infrared camera and optical sensors in real time for optimizing the reliability and accuracy of the determined amount of primary scale, A module for acquiring and processing the features of each product (material, dimensions, etc.) as well as its thermal path in the furnace.

A module for acquiring and processing the features of the atmosphere in the vicinity of each product during heating in the furnace.

A model for predicting the loss on ignition that is constructed on the basis of the measurements of the furnace process and of measurements of the loss on ignition.

A module providing the furnace control system with guidance indications for intelligently heating the products in the furnace in order to minimize scale growth during heating.

A module for extracting information relating to scale growth and its morphology originating from massive and varied data of the furnace, without requiring the intervention of an operator.

A module accumulating both furnace operating data and loss on ignition measurements in real time in order to enhance the reliability of a model for predicting and controlling loss on ignition.

BRIEF DESCRIPTION OF THE FIGURES

Further features and advantages of the invention will become apparent from the following detailed description, which can be understood with reference to the accompanying drawings, in which:

FIG. 1 is a schematic side view of a conventional facility for reheating an iron and steel product showing the layout of an infrared camera according to one embodiment of the invention:

FIG. 2 is a right-hand view of FIG. 1 also showing the layout of an infrared camera and optical sensors according to one embodiment of the invention;

FIG. 3 is a schematic view of a section of a product showing the scale present on the surface of the product at 4 successive stages;

FIG. 4 is a schematic side view showing the positioning of an infrared camera according to one embodiment of the invention;

FIG. 5 is a schematic view showing the map of the primary scale on the upper face of a product upon exiting the furnace obtained by an infrared camera according to the invention;

FIG. 6 is a schematic view showing digital processing of the map of the primary scale upon exiting the furnace for determining the ratio between the bonded scale and the non-bonded scale according to the invention;

FIG. 7 is a schematic view showing a flowchart of the steps of the method according to the invention;

FIG. 8 is a schematic side view showing the positioning of an optical sensor according to one embodiment of the invention;

FIG. 9A is a schematic view of the positioning of an optical sensor according to FIG. 8, but as a top view;

FIG. 9B is a schematic view of the positioning of an optical sensor according to an alternative embodiment, but as a side view;

FIG. 10 is a schematic view of the device for determining loss on ignition according to one embodiment of the invention;

FIG. 11 is a diagram showing the accuracy of the optimized law for determining loss on ignition according to the invention.

DETAILED DESCRIPTION OF THE INVENTION

Since the embodiments described hereafter are by no means limiting, alternative embodiments of the invention can be particularly considered that comprise only a selection of the features that are described, subsequently isolated from the other described features, provided that this selection of features is sufficient to confer a technical advantage or to differentiate the invention from the prior art. This selection comprises at least one preferably functional feature without structural details, or with only some of the structural details if this portion alone is sufficient to confer a technical advantage or to differentiate the invention from the prior art.

Throughout the remainder of the description, elements having an identical structure or similar functions will be designated using the same reference signs.

FIGS. 1 and 2 show the principle of an iron and steel product rolling facility. In FIG. 1, a roller table 3 conveys a product 2 opposite a furnace 4 for reheating iron and steel products. Upstream of the roller table 3, in the direction of travel of the product 2, a loading machine 1, for example, with fingers, grasps the product 2 and places it in the furnace 4 on transfer beams (not shown).

As it passes through the furnace, the product 2 gradually heats up according to a predetermined heating curve, defining a thermal path, for example, in order to be brought from the ambient temperature to a discharging temperature upon exiting the furnace that typically ranges between 1,050° C. and 1,300° C.

A reheated product 5 is taken out of the furnace 4 by a discharging machine 7, for example, with fingers, and is placed on another roller table 6 that discharges it to a rolling mill (not shown).

FIG. 2 shows the roller table 6 for discharging the reheated product 5 after it exits the furnace 4. This product is moved by the roller table 6 to a descaling machine 8. In FIG. 2, the product inside the descaling machine 8 is numbered 5'. The product 5' is exposed in the descaling machine 8 to high pressure water jets 9, 10. The high pressure water jets are respectively oriented on an upper part and a lower part of the product 5'. These water jets are arranged to detach the primary scale present on the surface of the product 5' and to discharge said scale along a circuit 11 towards settling tanks (not shown) for the recovery thereof.

Following descaling by the descaling machine 8, the product is conveyed to the inlet of a rolling machine 12. In the rolling machine, the product is referenced 5". The product 5" passes through two rolling sections 12*a*, 12*b*. The rolling sections 12*a*, 12*b* are arranged to obtain a sheet from the product 5" that has the desired thickness.

According to the embodiment that is shown, the device for determining loss on ignition of the scale produced by the reheating comprises sensors arranged at the outlet of the furnace 4 and on the descaling machine 8, This device combines physical measurements and the result of digital modeling carried out by computer programs.

It is designed to compare the amount of scale that is produced with limits set according to the heating mode and the nature of the steel reheated in the furnace. This comparison allows a corrective heating strategy to be developed that is capable of maintaining, or returning, the scale that is produced within the desired limits in terms of amount and quality.

FIG. 3 shows a section view of a product schematically showing the scale present on the product at various steps of the process:

- sub-figure A: Product 2 upstream of the reheating furnace. It is assumed that the surface is not covered with scale (in practice, it can include bonded scale formed during earlier steps).
- sub-figure B: Product 5 exiting the reheating furnace in the theoretical case whereby no scale has fallen from the lower face of the product (in practice, this case B does not occur for a furnace with tubular beams). Starting from the center of the product, this is covered on these two lower and upper faces with a layer of bonded primary scale (CPCS on the upper face and CPCI on the lower face), followed by a layer of bonded primary scale (CPAS on the upper face and CPAI on the lower face), then a layer of non-bonded primary scale (CPNS on the upper face and CPNI on the lower face). In theory, after the layer of bonded primary scale, it is possible to have only bonded primary scale or only non-bonded primary scale. In practice, this does not occur.
- sub-figure C: Product 5 exiting the reheating furnace in the case whereby all the non-bonded scale on the lower face of the product CPNI has fallen into the furnace. Non-bonded scale falling into the furnace is facilitated by the contacts between the product and the transport mechanics of the product and the translation movement between the inlet and the outlet of the furnace. In practice, non-bonded scale can still be present on the lower face of the product exiting the furnace and can fall from the product between the furnace and the descaling machine. However, as this is a small amount, it is not taken into account.
- sub-figure D: Product 5" exiting the descaling machine. All non-bonded and bonded primary scale still present on the product entering the descaling machine has been removed. Only the bonded primary scale CPCS, CPCI remains on the product.

According to the embodiment shown in FIGS. 1, 2 and 4, an infrared camera 20 is located in the vicinity of the furnace, on the product discharge side.

The infrared camera 20 is positioned above the reheated product 5 when said product is arranged on a predetermined discharging surface.

In the example shown, the predetermined discharging surface is formed by the roller table 6. Furthermore, the infrared camera is positioned in the vicinity of the roller table 6 for discharging products toward the descaling machine 8.

According to an alternative embodiment that is shown, the infrared camera could be disposed below the reheated product 5.

The photosensitive sensor of the infrared camera uses optoelectronic properties, i.e. the ability to react to a variation in light intensity. Advantageously, the camera is selected, and it is positioned at a distance from the roller table, so that its field of vision P20 covers the entire width of the widest product reheated in the furnace.

With this type of rolling facility generally being used for long products, such as slabs, the field of vision of the infrared camera does not generally allow the entire length of the products to be covered with good measurement accuracy.

As shown in FIG. 5, successive images are taken when the product moves on the roller table at a sufficient frequency for obtaining a partial overlap of the product between two successive images of a portion 5.1, 5.2, 5.*n* of the product. Digital processing of the successive images carried out by a computer program, called "Image processing," allows an image of the whole product to be constituted. This type of processing can be likened to that of constructing a panorama from several photographs having overlapping areas.

As an alternative embodiment, at least two infrared cameras are used to cover the entire width of the widest product reheated in the furnace.

The bonded primary scale CPAS and the non-bonded primary scale CPNS can be discriminated based on processing of the image of the entire product. Since the emissivity of bonded and non-bonded scale is substantially the same, the light intensity emitted by a surface of the product directly represents its temperature. The light intensity emitted by non-bonded scale is substantially lower than that of bonded scale due to a lower temperature. Thus, the image formed by an infrared camera of the surface of the product covered with non-bonded scale appears dark and the image formed by an infrared camera of the surface of the product covered with bonded scale appears light. Indeed, the non-bonded scale cools more quickly than the bonded scale when the product leaves the furnace, not benefiting, or to a lesser extent, from calorific intake from the core of the product. The image formed by an infrared camera of the surface of the product thus appears to be spotted, with a greater or lesser proportion of dark zones depending on the amount of non-bonded scale. The setting of the infrared camera is adjusted so that the distinction between dark and light areas is marked.

This image is digitally processed by a computer program, for example, implemented within a digital processing module (S2), in order to map the distribution of the non-bonded scale on the upper face of the product and to determine an overall ratio between the bonded and non-bonded scale thereon.

The digital processing thus implements binarization of the infrared image into two classes of pixels, one class of pixels that corresponds to the pixels associated with the presence of scale that is bonded on the face of the product and the other class of pixels that corresponds to the pixels associated with the presence of scale that is not bonded on the face of the product.

To this end, the binarization of the infrared image can be carried out by thresholding or by one or more image segmentation operations, for example, by means of a segmentation based on the regions, a segmentation based on the contours, a segmentation based on a classification or a thresholding of the pixels as a function of their intensity, possibly adaptive, or on an amalgamation or combination of the first three segmentation operations.

The module S2 also can be configured to determine the amounts of non-bonded scale and bonded scale on the face of the product on the basis of the binarized image.

It is thus possible to modify, by means of a particular module (not shown), one or more furnace control parameters on the basis of the determined amounts of non-bonded scale and of bonded scale.

FIG. 6 shows the result of the digital processing for determining the aforementioned ratio for three examples of products with different proportions of non-bonded scale. The proportion of non-bonded scale is the highest in the example of FIG. 6.1 and is the lowest in the example of FIG. 6.3. The right-hand part of each of the sub-figures of FIG. 6 shows these proportions with partial views of the upper face of these products, with the non-bonded scale being shown in black. The result of the digital processing carried out by the digital processing module (S2) assumes the form of a histogram shown on the left-hand part of the figure, with the product temperature being on the abscissa (according to the light intensity received by the pixels of the camera) and the number of pixels with this temperature being on the ordinate.

In other words, for each abscissa of the histogram, the ordinate represents the amount of surface units of the product with this temperature. On this diagram, a predetermined temperature threshold TL defines the scale according to its nature. The sum of the pixels with a temperature that is lower than TL, on the left-hand part of the histogram, corresponds to the surface of the upper face of the product covered by non-bonded scale. The sum of the pixels with a temperature that is higher than TL, on the right-hand part of the histogram, corresponds to the surface of the upper face of the product covered by bonded scale. The temperature TL can be determined from tests on samples. It is 950° C., for example. This processing of the image of the upper face of the product that is obtained by the infrared camera thus allows the ratio of proportions of non-bonded and bonded scale on the whole of the upper face of the product to be quantified.

In other words, the aforementioned ratio can be determined as the ratio of the surface between 0° C. and the predetermined temperature TL to the surface between the predetermined temperature TL and a predetermined discharging temperature of the curve representing the amount of pixels as a function of a pixel intensity.

In other words, the aforementioned ratio can be determined as the ratio of the integral between 0° C. and the predetermined temperature IL to the integral between the predetermined temperature TL and a predetermined discharging temperature of the curve representing the amount of pixels as a function of a pixel intensity.

The images obtained by the infrared camera also provide information relating to the actual temperature of the product upon exiting the furnace. It is thus possible to determine the temperature profiles over the width and the length of the product, as well as the stability of the discharging temperature of the products that are successively discharged. This information can be used to adjust the operation of the furnace in order to obtain a stable temperature and the desired product temperature profile, for example, by adjusting the power of the burners and/or their operation in long flame or short flame mode.

With reference to FIG. 7, the furnace monitoring and control system 60 has real-time information relating to the operation of the furnace, in particular one or more measurements of the ambient temperature inside the furnace, the temperature of the flue gases, the oxygen content of the flue gases, the operating regimes of the burners, the operating mode of the burners when this can change, for example, between a short flame mode and a long flame mode for the same power output, the dimensions of the product and its composition. This information is used for digital simulations in order to estimate the evolution of the environment in the vicinity of each point of the surface of the product while the product remains in the furnace and to simulate the formation of scale by means of physicochemical models.

The data stored by the furnace monitoring and control system 60, combined with the temperatures of the product measured upon exiting the furnace by means of the infrared camera, allow the evolution of the temperature map of the product to be estimated from the time it enters the furnace until it is discharged from the furnace using mathematical models. It is thus possible to compute a curve showing the thermal path followed at each point of the surface of the product.

In addition to the infrared camera, the invention is also based on the use of optical sensors for thickness measurements. They are used to quantify the amount of primary scale that is removed by the descaling machine. Thus, the invention comprises at least two optical sensors, one placed upstream of the descaling machine and the other placed downstream thereof. They allow the height of the product upstream and downstream of the descaling machine to be determined, and by virtue of the difference in these heights, knowing the dimensions of the product, they allow the amount of scale removed in the descaling machine to be computed.

As shown in FIG. 2, according to a first example of the layout of the optical sensors according to the invention, a first sensor 30 is placed on the side of the upper face of the product upstream of the descaling machine and a second sensor 40 is placed on the side of this same upper face of the product downstream of the descaling machine. For each point in the area scanned by a sensor, a distance measurement is carried out with accuracy of the order of a micrometer. Only the first sensor 30 will be described hereafter, given that the arrangement of this sensor is identical to that of the second sensor 40. Similarly, optical sensors will be described hereafter that are placed in line with a product resting on a roller table, given that the product can rest on any other reference surface.

As shown in FIG. 8, according to the first example of the layout of the optical sensors, the sensor 30 placed above the product is arranged vertically relative to a roller 14 of the roller table of the descaling machine on which the products circulate.

The sensor is placed on one side of the product so that its field of measurement covers at least part of the upper face of the product, when a product is present under the sensor, and at least part of the upper generatrix of said roller (or a reference surface). It is disposed at a predetermined distance from the roller, for example, ranging between 250 and 1,000 mm. The sensor 30 allows the distance to be determined between the upper face of the product 5 and the upper generatrix of the roller 14, with this distance corresponding to the height of the product.

As shown in FIG. 9A, the sensor is advantageously inclined by an alpha angle, in the horizontal plane, with respect to the longitudinal axis of said roller, for example, by an angle of 5° to 85°. This incline ensures that the beam of the sensor covers the upper generatrix of the roller on at least one point 18. Indeed, if the sensor was arranged with its field of measurement parallel to the axis of the roller, the sensor would need to be perfectly vertically aligned with respect to the roller so that the sensor 30 sees the upper generatrix of the roller and not a generatrix placed on a lower plane.

The measurements taken from the sensors 30, 40 separate into two phases. The first phase, called "Baseline measurement," is carried out in the absence of product. The system continuously scans the roller surface of the roller table to detect both the vibration of the roller and the distance between the sensor and the apex of the roller. The measurements are stored and processed by a computer program in order to define the actual distance between the sensor and the apex of the roller. This step can be likened to a calibration step without product. The second phase, called "Product measurement," is carried out when a product passes over the roller table. Taking into account the measurements taken during the first phase, also called the calibration step, allows the measurements of the second phase to be corrected so as to obtain an accurate measurement of the height of the product.

According to another embodiment of the invention shown in FIG. 9B, the optical sensors 30, 40 are substantially placed on one of the sides of the product. The sensors are arranged so that their fields of measurement cover the side of the product. The thickness measurement of the product is thus carried out directly.

As an alternative embodiment, optical sensors are placed on both sides of the product.

The device defines an average height over the width of the product covered by the field of measurement of the sensor and over the length of the product. As is schematically shown in FIG. 5, the non-bonded scale generally covers only part of the width of the product, in the form of islands. As the lower face of the product has fallen into the furnace, the lower face of the product assumes the form of an undulating surface, with depressions where the non-bonded scale was located. The result is that, at the thickness measurement point at the inlet of the descaling machine, the product rests on the generatrix of the rollers only in the vicinity of the scale that is still present on the product, i.e. the bonded scale. The height measured by the sensor 30 thus takes into account the total height of the primary scale, bonded and non-bonded, formed in the furnace despite the absence of the non-bonded scale that has fallen upstream of the descaling machine, mainly in the furnace.

On the basis of these thickness measurements of the product entering and exiting the descaling machine, knowing the width and the length of the product, it is easy to compute the amount of bonded and non-bonded primary scale that is formed on the product, and therefore the loss on ignition.

The infrared and optical sensors that are used according to the invention are well suited to the requirements and operating conditions of a facility for reheating iron and steel products since they:

- allow products to be scanned at very high temperatures, i.e. above 1,000-1,300° C., by being equipped with a heat protection system;
- allow a surface of non-smooth scale to be scanned having an inhomogeneous thickness;
- are not hindered by the significant difference in weight and thickness between the product and the scale: 25,000 kg and 250 mm thick for a slab compared to 200 kg and 2 mm thick, approximately, for the scale.

FIG. 7 graphically shows part of the steps of the method according to the invention. In this figure, a square mark represents physical equipment (hardware), a diamond mark represents a digital processing step by a computer program (software), and a circle mark represents a result. The arrows indicate the direction in which the steps occur and/or the direction in which an information flow circulates.

- Step 1: An infrared camera 20 takes successive images of portions of the upper face of a reeled-off product and sends them to a computer server 50.
- Step 2: A computer program implemented in a digital processing module S1 processes these images and delivers, as a result R1, a reconstituted image of the entire upper face of the product showing the distribution of bonded scale and of non-bonded scale on the upper face of the product (measurement), and it also delivers, as a result R2, the average temperature of the upper face of the product (measurement).
- Step 3: A computer program implemented in a digital processing module S2 processes the image obtained as R1 and delivers, as a result R3, the ratio of overall proportions of bonded and non-bonded scale on the upper face of the product.
- Step 4: The server 50 receives information from the furnace monitoring and control system 60 relating to the product (dimensions, material, etc.), data relating to the operation of the furnace on the basis of measurements taken by sensors (temperatures, pressures, oxygen content in the flue gases, etc.), with these measurements being able to be carried out at several points per furnace regulation zone,
- Step 5: On the basis of the data available in the server 50, and by means of mathematical models, a computer program implemented in a digital processing module S3 computes the average temperatures for discharging product on these two faces, as well as the thermal paths followed by each of these faces. The average temperature computed on the upper face constitutes the result R4.
- Step 6: A computer program implemented in a digital processing module S4 compares the average temperature of the upper face of the product upon discharging that is obtained by simulation (result R4) and that obtained through a measurement with the infrared camera 20 (result R2), then delivers, as a result R5, a factor of the difference between results R2 and R4 to the server 50.
- Step 7: On the basis of the data available in the server 50, and by means of mathematical models, a computer program implemented in a digital processing module S5 computes the difference in the thermal paths of the two faces of the product, and the oxygen content in the vicinity thereof, as the product passes through the furnace, and, by means of scale formation laws, determines, as a result R6, a ratio of overall proportions of bonded and non-bonded scale on the upper face of the product and, as a result R7, a ratio of overall proportions of bonded and non-bonded scale on the lower face.
- Step 8: A computer program implemented in a digital processing module S6 determines a difference between the ratio of overall proportions of bonded and non-bonded scale on the upper face of the product that is obtained by simulation (result R6) and that obtained by a measurement from the infrared camera (result R3) and, depending on this and the initial value of the ratio of bonded and non-bonded scale proportions on the lower face (result R7), delivers, as a result R8, a corrected ratio of overall proportions of bonded and non-bonded scale on the lower face.

Step 9: At least one optical sensor 30 measures the thickness of the product entering the descaling machine and at least one optical sensor 40 measures the thickness of the product exiting the descaling machine. These data are processed by a computer program implemented in a digital processing module S7 that delivers, as a result R9, the total average thickness of the primary scale on the two faces of the product.

Step 10: On the basis of the data available in the server 50 relating to the dimensions of the product and the total average thickness of the primary scale on the two faces of the product obtained by the optical sensors (result R9), a computer program implemented in a digital processing module S8 delivers the measured loss on ignition as a result R10.

Stage 11: A computer program implemented in a digital processing module S9 compares the loss on ignition determined by means of the optical sensors (result R10) with the ratio of non-bonded scale on the upper face determined from the infrared camera (result R3) and that of the lower face after correction (result R8) and delivers, as a result R11, the amount of non-bonded scale that has fallen into the furnace.

Step 12: A computer program implemented in a digital processing module S10 gathers and processes the process data available in the server 50, the loss on ignition (result R10) and the volume of scale that has fallen into the furnace during heating (result R11), and delivers, as a result R12, a process report that feeds a database 51.

Step 13: On the basis of data from the database 51, a computer program implemented in a digital processing module S11 regularly delivers, by self-learning as a result R13, an optimized law for predicting loss on ignition.

Step 14: A computer program implemented in a digital processing module S12 uses the optimized law for predicting loss on ignition (result R13) and delivers, as a result R14, an optimal heating strategy (thermal path of the product, oxygen content in the furnace, etc.) for minimizing the amount of scale formed when heating the product that it sends to the furnace monitoring and control system 60.

KEY FOR FIG. 7

20: Infrared camera
30: Optical sensor at the inlet of the descaling machine
40: Optical sensor at the outlet of the descaling machine
50: Scale computer server
51: Process database
60: Furnace monitoring and control system
S1 to S12: Digital processing modules comprising computer programs
R1: A reconstituted image of the entire upper face of the product showing the distribution of the bonded scale and of the non-bonded scale on the upper face of the product (measurement).
R2: Average temperature of the upper face of the product (measurement).
R3: Proportion ratio of the bonded scale and of the non-bonded scale on the upper face of the product (measurement).
R4: Average temperature of the upper face of the product (simulation).
R5: Variance factor between the average temperature of the upper face determined on the basis of the infrared camera (result R2) and that obtained by simulation (result R4).
R6: Proportion ratio of the bonded scale and of the non-bonded scale on the upper face of the product (simulation).
R7: Proportion ratio of the bonded scale and of the non-bonded scale on the lower face of the product (simulation).
R8: Corrected proportion ratio of the bonded scale and of the non-bonded scale on the lower face of the product.
R9: Total average thickness of the primary scale upon entering the descaling machine.
R9: Non-bonded scale surface of the lower face of the product.
R10: Loss on ignition.
R11: Amount of non-bonded scale from the lower face of the product that has fallen into the furnace.
R12: Furnace process data
R13: Loss on ignition prediction law.
R14: Optimal heating strategy for limiting loss on ignition.

As shown in FIG. 10, the furnace according to the invention is monitored and controlled from:

a system L3 for optimizing the operation of the level 3 furnace on the basis of input data relating to the products to be reheated (dimensions, weight, steel composition, rolling conditions, etc.) and process data, in particular the target discharging temperatures;

a system L2 for optimizing the regulation of the level 2 furnace on the basis of the instructions provided by the system L3 for optimizing the operation of the furnace, process data (product heating curves and data L0 provided by the instrumentation of the furnace);

a "Machine learning" computer program L2' improving the system L2 for level 2 optimization of furnace regulation by self-learning on the basis of results R1 of digital simulations of the amount of scale and the temperature of the product and of results R2 of the amount of scale determined by digital processing D on the basis of the data M supplied by the infrared camera 20 and the optical sensors 30, 40 for measuring thickness on the descaling machine;

a system L1 for controlling the equipment of the furnace using level 1 local control loops on the basis of the instructions provided by the system L2 for optimizing the regulation of the furnace and data L0 provided by the instrumentation of the furnace.

The furnace monitoring and control system according to the invention takes into account a very large amount of furnace process data and scale measurements (Big data). The raw data from the instruments is approximately 120 megabytes per product.

For normal production of a slab reheating furnace of 360 products per day, this represents approximately 43 gigabytes of data per day. In order to obtain useful information for controlling the furnace from this very large amount of data, algorithms (also called Data Science) are applied. They allow the essential information to be extracted from the measurements that are carried out, while ensuring their reliability despite the difficult environment of a pre-rolling reheating furnace. The furnace monitoring and control system thus uses key information to intelligently heat the products in the furnace by managing the formation of scale during heating, in particular based on key process variables, such as:

- the thermal path and the residence time of the product in the critical zones of the furnace;
- the atmosphere of the furnace;
- the composition of the steel.

FIG. 11 is a diagram showing the tests carried out for different operating conditions in order to verify the performance of the optimized law for predicting loss on ignition (result R13) according to the invention. The product number is shown on the abscissa and the amount of loss on ignition is shown on the ordinate. On this diagram, the diamonds correspond to the losses on ignition obtained by measurements on samples and the squares represent the losses on ignition determined with the optimized prediction law. It can be seen that the optimized prediction law yields results that are very close (with less than 10% variation on average), to those observed on the samples.

Of course, the invention is not limited to the examples that have just been described and numerous modifications can be made to these examples without departing from the scope of the invention. In addition, the various features, forms, alternative embodiments, and embodiments of the invention can be grouped together in various combinations as long as they are not incompatible or mutually exclusive.

The invention claimed is:

1. A method for controlling a furnace for reheating iron and steel products having an inlet and an outlet in a reeling-off direction of the product, comprising:

- forming an infrared image, using an infrared camera, of an upper face of a product over the width and at least partially over the length thereof when said product is arranged on a predetermined discharging surface;
- digital processing comprising binarization of the infrared image into two classes of pixels, one class of pixels that corresponds to the pixels associated with the presence of scale that is bonded on the face of the product and the other class of pixels that corresponds to the pixels associated with the presence of scale that is not bonded on the upper face of the product;
- determining the amounts of non-bonded scale and of bonded scale on the upper face of the product on the basis of the binarized image;
- modifying furnace control parameters on the basis of the determined amounts of non-bonded scale and bonded scale.

2. The control method according to claim 1, further comprising determining a ratio of the amount of bonded scale to the amount of non-bonded scale.

3. The control method according to claim 1, wherein the binarization is carried out by thresholding the light intensity of the pixels.

4. The control method according to claim 1, further comprising digital processing for determining a loss on ignition of the product.

5. The control method according to claim 4, comprising measuring the height of the product using two sensors that are respectively arranged upstream and downstream of a descaling machine located downstream of the furnace, and digital processing for determining the loss on ignition of the product by determining the difference in the height of the product between the upstream side and the downstream side of said descaling machine.

6. The furnace control method according to claim 4, comprising, when the upper face is imaged by the infrared camera, determining the amount of scale on the lower face of the product that has fallen into the furnace using digital simulations on the basis of the amounts of non-bonded scale and of bonded scale on the upper surface of the product obtained on the basis of the binarized image, on the basis of the determined loss on ignition, and of a correlation of these results with operating readings of the furnace and a scale formation prediction law.

7. The method according to claim 6, wherein the scale formation prediction law is modified by self-learning.

8. The method according to claim 5, comprising a step of reducing the loss on ignition and an amount of scale that will fall into the furnace for a second product, the reheating of which is carried out after that of a first product by modifying operating parameters of the furnace as a function of the loss on ignition of the first product when it passes through the furnace and the determined amounts of non-bonded scale and bonded scale.

9. A computer program product comprising instructions that causes a facility to execute the steps of the method according to claim 1;

- wherein the facility comprises a furnace for reheating iron and steel product and a device for controlling the furnace;
- wherein the device for controlling the furnace has an inlet and an outlet in a reeling-off direction of the product and comprises:
  - an infrared camera provided to form an infrared image of an upper face of a product over the width and at least partially over the length thereof when said product is arranged on a predetermined discharging surface;
  - a digital processing module arranged to carry out binarization of the infrared image into two classes of pixels, one class of pixels that corresponds to the pixels associated with the presence of scale that is bonded on the face of the product and the other class of pixels that corresponds to the pixels associated with the presence of scale that is not bonded on the face of the product;
  - a module for determining the amounts of non-bonded scale and of bonded scale on the upper face of the product on the basis of the binarized image; and
  - a module for modifying furnace control parameters on the basis of the determined amounts of non-bonded scale and of bonded scale.

10. A device for controlling a furnace for reheating iron and steel products having an inlet and an outlet in a reeling-off direction of the product, comprising:

- an infrared camera provided to form an infrared image of an upper face of a product over the width and at least partially over the length thereof when said product is arranged on a predetermined discharging surface;
- a digital processing module arranged to carry out binarization of the infrared image into two classes of pixels, one class of pixels that corresponds to the pixels associated with the presence of scale that is bonded on the face of the product and the other class of pixels that corresponds to the pixels associated with the presence of scale that is not bonded on the face of the product;
- a module for determining the amounts of non-bonded scale and of bonded scale on the upper face of the product on the basis of the binarized image;

a module for modifying furnace control parameters on the basis of the determined amounts of non-bonded scale and of bonded scale.

11. The control device according to claim 10, further comprising two sensors that are respectively arranged upstream and downstream of a descaling machine located downstream of the furnace, and a digital processing module configured for determining the loss on ignition of the product by determining the difference in the height of the product between the upstream side and the downstream side of said descaling machine.

12. A facility comprising:

a furnace for reheating iron and steel product;

a device for controlling the furnace according to claim 10.

* * * * *